(12) United States Patent
Schneider

(10) Patent No.: US 7,908,283 B2
(45) Date of Patent: Mar. 15, 2011

(54) FINDING SUPERLATIVES IN AN UNORDERED LIST

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 531 days.

(21) Appl. No.: 11/897,446

(22) Filed: Aug. 29, 2007

(65) Prior Publication Data

US 2009/0063485 A1 Mar. 5, 2009

(51) Int. Cl.
*G06F 17/30* (2006.01)
(52) U.S. Cl. ............................................. 707/752; 26/27
(58) Field of Classification Search ................ 707/7, 27
See application file for complete search history.

(56) References Cited

U.S. PATENT DOCUMENTS

| | | | |
|---|---|---|---|
| 2005/0114375 A1* | 5/2005 | Frieder et al. | 707/102 |
| 2005/0283573 A1* | 12/2005 | Mewhinney et al. | 711/136 |
| 2008/0306819 A1* | 12/2008 | Berkhin et al. | 705/14 |

* cited by examiner

*Primary Examiner* — Charles Kim
*Assistant Examiner* — Anteneh Girma
(74) *Attorney, Agent, or Firm* — Blakely, Sokoloff, Taylor & Zafman LLP

(57) ABSTRACT

The k first elements from an unordered list of n total elements are copied to a result buffer, wherein k is a value smaller than n. The k first elements in the result buffer are sorted. Each subsequent element in the unordered list is compared to elements in the result buffer. If the subsequent element belongs in the result buffer, a current element in the result buffer is replaced with the subsequent element. The elements in the result buffer are then resorted.

20 Claims, 7 Drawing Sheets

… (US 7,908,283 B2)

FINDING SUPERLATIVES IN AN UNORDERED LIST

TECHNICAL FIELD

Embodiments of the present invention relate to data sorting, and more specifically to determining multiple largest or smallest values in an unordered set.

BACKGROUND

It is often beneficial to determine multiple largest or smallest values in an unordered list (or other data set). There are two conventional methods for finding such largest or smallest values. In a first conventional method, the entire unordered list is sorted (from highest to lowest or from lowest to highest). Once the list is sorted, any number of largest values (e.g., the five largest values) or smallest values (e.g., the three smallest values) can be determined. However, sorting an unordered list can be a time consuming process. Moreover, sorting the list modifies the list. To avoid modifying the list, the entire list must be copied, and the copy must then be sorted. Therefore, if it is desirable for the original data (the unsorted list) to remain unchanged, sorting the list requires approximately twice the memory occupied by the original data.

In a second conventional method of determining multiple largest or smallest values in an unordered list, a single smallest or largest value is determined. The value is removed from the unordered list, and the process is repeated to find the new highest or lowest value. This process repeats until a required number of largest or smallest values are determined. The second conventional method requires that the entire unordered list be searched once for each largest or smallest value required. This can be inefficient, and can require considerable time to complete. Moreover, the second conventional method requires that the original data (unordered list) be modified (by deleting a largest or smallest value once it is found). To avoid modifying the unordered list, the list needs to be copied before largest or smallest values are determined. As with the first conventional method, this requires additional memory usage.

BRIEF DESCRIPTION OF THE DRAWINGS

The present invention is illustrated by way of example, and not by way of limitation, in the figures of the accompanying drawings and in which.

DETAILED DESCRIPTION

Figure 1:
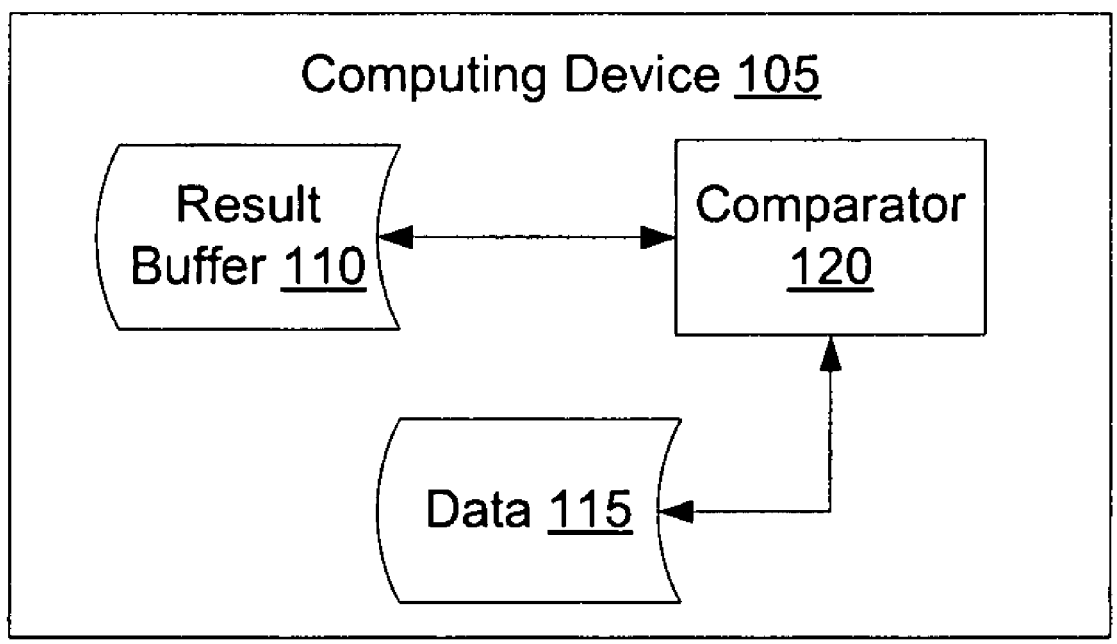
FIG. 1 illustrates a computing device, in accordance with one embodiment of the present invention.

Described herein is a method and apparatus for finding superlative elements in data. In one embodiment, the k first elements from an unordered list of n total elements are copied to a result buffer, wherein k is a value smaller than n. In one embodiment, n is at least twice the size of k. Each subsequent element in the unordered list is compared to elements in the result buffer. In one embodiment, each subsequent element in the unordered list is compared to the largest or the smallest element in the result buffer. If the subsequent element belongs in the result buffer, a current element in the result buffer is replaced with the subsequent element. In one embodiment, the subsequent element belongs in the result buffer if it is larger than a smallest element in the result buffer. In another embodiment, the subsequent element belongs in the result buffer if it is smaller than a largest element in the result buffer. The elements in the result buffer are then resorted.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "determining", "generating", "comparing", "sorting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates a computing device 105, in accordance with one embodiment of the present invention. The computing device 105 may be a desktop computer, notebook computer, cellular phone, personal digital assistant (PDA), or other device capable of processing machine-executable code. In one embodiment, the computing device 105 includes data 115, a comparator 120, and a result buffer 110.

Data 115 may be data of arbitrary size (having up to n total elements). In one embodiment, data 115 can be accessed in a random access fashion (e.g., where data 115 is stored in a storage medium such as a hard disk drive, random access memory (RAM), read only memory (ROM), optical media, magnetic media, etc). Alternatively, data 115 may include a data stream that is in transit between a source and a destination (e.g., via a carrier wave). In one embodiment, data 115 is an unordered list of elements. In another embodiment, data 115 is tabular (represented as tables). Examples of tabular data include comma delimited files, spreadsheets, etc. Alternatively, data 115 may include other unordered arrangements of elements.

Comparator 120 finds superlative elements (e.g., largest and smallest elements) in data 115. In one embodiment, comparator 120 is a logic executed by a microcontroller, field programmable gate array (FPGA), application specific integrated circuit (ASIC), or other dedicated processing unit. In another embodiment, comparator 120 is a logic executed by a central processing unit. Alternatively, comparator 120 may include a state machine (e.g., an internal logic that knows how to perform a sequence of operations), a logic circuit (e.g., a logic that goes through a sequence of events in time, or a logic whose output changes immediately upon a changed input), or a combination of a state machine and a logic circuit.

If data 115 includes a data stream, then comparator 120 generates a copy of data 115 prior to finding largest or smallest elements. If data 115 does not include a data stream, then a copy of data 115 may or may not be generated.

To find superlative elements in data 115, comparator 120 generates a result buffer 110. Result buffer 110 maintains a record of highest or lowest elements that have been examined in data 115. The number of elements copied into result buffer 110 is dependant upon a number (k) of superlatives that comparator 120 is searching for. For example, if comparator 120 is searching for the 5 highest elements in data 115, then result buffer 110 holds five elements. The value of k can be user selected, or determined by an application or program, or selected automatically based on predetermined criteria.

Result buffer 120 may keep track of where in data 115 the elements in the result buffer 120 are located. For example, result buffer 120 may maintain pointers to elements in data 115 that correspond to elements in the result buffer 120. Alternatively, or in addition, result buffer 120 may include additional information associated with elements in the result buffer 120, such as information associated with the corresponding elements in data 115.

As comparator 120 examines each element in data 115, it replaces an element in result buffer 110 if the examined element in data 115 is larger or smaller than an element in the result buffer 110 (depending on whether the largest elements or smallest elements are being searched for). Comparator 120 may also replace additional information associated with the deleted element with information associated with the new element.

In one embodiment, comparator 120 sorts the result buffer 110 each time a new element is added. This permits a subsequent element of the data 115 to be compared only to the largest or smallest element in the result buffer 110, which may speed up comparison results. In one embodiment, comparator 120 sorts the result buffer 110 by maintaining a sorted auxiliary array of indices for the elements in the result buffer 110. Each entry in the auxiliary array may point to an element in the result buffer 110. The auxiliary array of indices may be sorted without rearranging the order of the elements in the result buffer 110, which may minimize read/write times and maximize efficiency. In one embodiment, the auxiliary array of indices is part of the result buffer 110. Alternatively, the auxiliary array of indices may be separate from the result buffer 110.

An amount of time that it takes comparator 120 to determine the k largest (or smallest) elements in data 115 having n total elements is proportional to k*n. For an average comparison time of $C_{avg}$ (which includes the average sort time for sorting the result buffer after an element in the result buffer is replaced), the average time to find the k largest or smallest elements can be represented by $T=C_{avg}*(k*n)$. In a best case scenario (in which no elements in the result buffer are replaced throughout the search), the total search time can be represented by $T_{best}=C_{best}*(k+n)$. In a worst case scenario (in which every subsequent element in the data replaces an element in the result buffer), the total search time can be represented by $T_{worst}=C_{worst}*(k*n)$.

In some cases, result buffer 115 may include multiple elements that have the same value. If a subsequent element is to replace one of these multiple elements, it generally will not matter which of the elements having the same value is replaced.

FIGS. 2A-2F illustrate exemplary intermediate stages in a process for finding the smallest five elements in an unordered list, in accordance with one embodiment of the present invention. The process may equally be used to find greater or fewer than five smallest elements (e.g., 10 smallest elements, 100 smallest elements, 2 smallest elements, etc.). The process may also be used to find any number of largest elements in an unordered list. In one embodiment, the process is performed by comparator 120 of FIG. 1. For the purpose of clarity, not all stages in a process for finding the smallest values in an unordered list are shown. For example, a separate stage is not illustrated for opening a file, for generating a result buffer, for generating an auxiliary array of indices, etc.

Figure 2A:
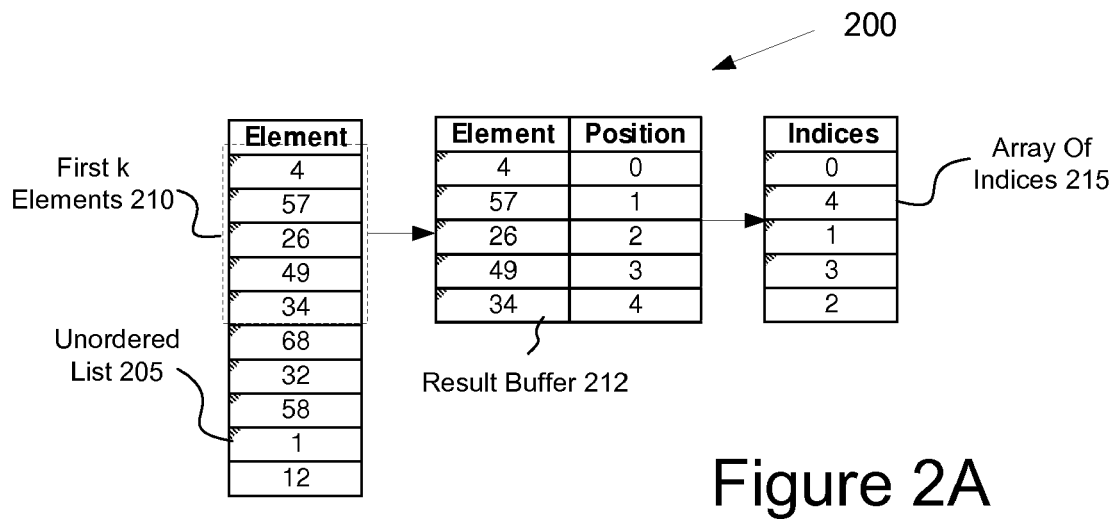
FIG. 2A illustrates a first exemplary stage in a process for finding the smallest five elements in an unordered list, in accordance with one embodiment of the present invention.

FIG. 2A illustrates a first exemplary stage 200 in a process for finding the smallest five elements in an unordered list, in accordance with one embodiment of the present invention. In the first exemplary stage 200, the first five elements 210 of an unordered list 205 are copied into a result buffer 212. The result buffer 212 may have been generated prior to the copying of the first five elements. Alternatively, the result buffer 212 may be generated as a result of the copying.

In the illustrated embodiment, the first five elements copied into the result buffer 212 have the values of 4, 57, 26, 49 and 34, respectively. Each element in the result buffer 212 has a position that indicates where in the result buffer 212 that element is located. For example, the first element (with a value of 4) has position 0, indicating that it is the first element in the result buffer. The second element (with a value of 57) has position 1, indicating that it is the second element in the result buffer, and so on.

An auxiliary array of indices 215 may be created that sorts the elements in the result buffer 212 from lowest to highest (or highest to lowest). Each entry in the auxiliary array of indices 215 corresponds to a position of the result buffer 212. For example, the first entry in the auxiliary array of indices 215 is 0, which is the position for the element having a value of 4. The second entry in the array of indices 215 is 1, which is the position for the element having a value of 26. The last entry in the auxiliary array of indices 215 corresponds to the largest element in the result buffer 212, which in the illustrated embodiment is the element having a value of 57 and a position of 1.

Rather than using the array of indices 215 to sort the result buffer 212, other means for sorting the result buffer 212 can also be used. For example, elements in the result buffer 212 may be rearranged such that the element that occupies the first position (0) in the result buffer 212 is the smallest element, the element occupying position 1 is the second smallest element, and so on.

Figure 2B:
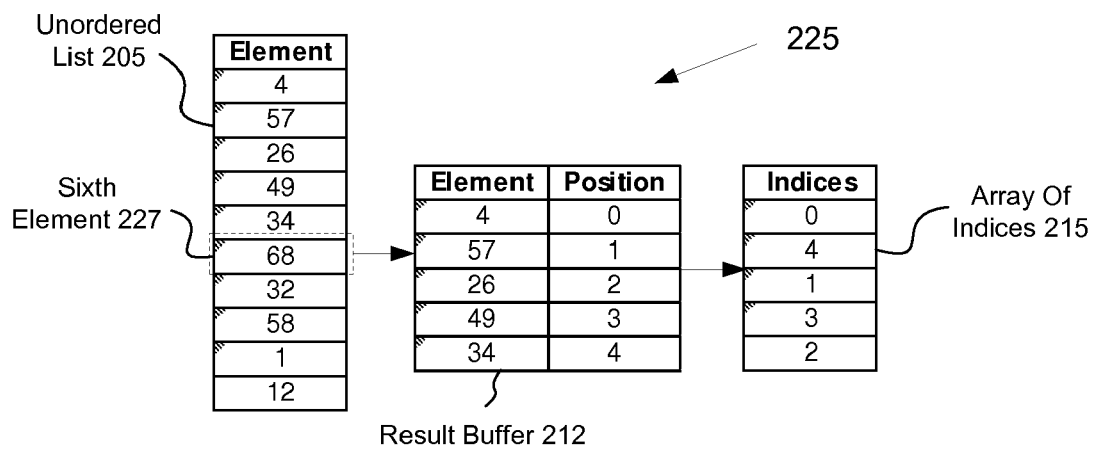
FIG. 2B illustrates a second exemplary stage in a process for finding the smallest five elements in an unordered list, in accordance with one embodiment of the present invention.

FIG. 2B illustrates a second exemplary stage 225 in a process for finding the smallest five elements in an unordered list, in accordance with one embodiment of the present invention. In the second exemplary stage 225, the sixth element 227 of the unordered list 205 is compared to the largest element in the result buffer (the last entry in the array of indices 215). In the illustrated embodiment, the sixth element 227 has a value of 68, which is larger than the largest element in the result buffer (having a value of 57 and occupying position 1). Therefore the sixth element 227 is not copied into the result buffer 212.

Figure 2C:
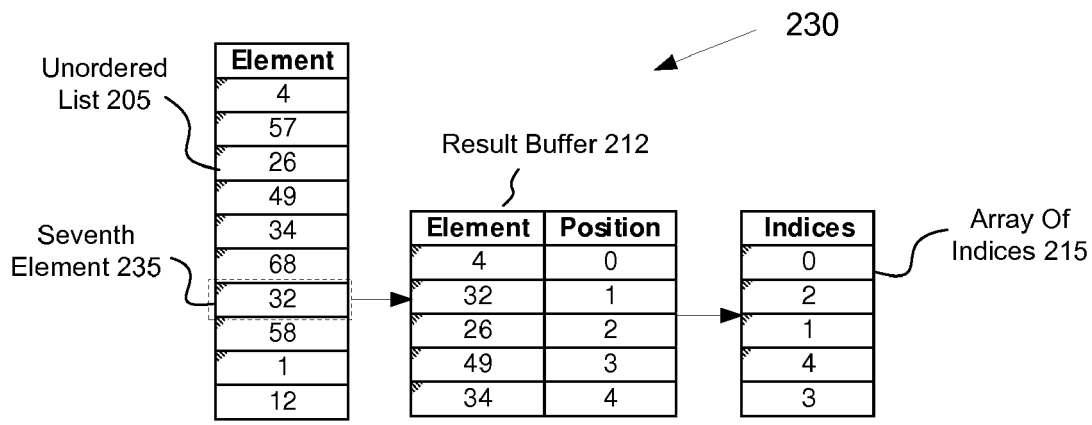
FIG. 2C illustrates a third exemplary stage in a process for finding the smallest five elements in an unordered list, in accordance with one embodiment of the present invention.

FIG. 2C illustrates a third exemplary stage 230 in a process for finding the smallest five elements in an unordered list, in accordance with one embodiment of the present invention. In the third exemplary stage 230, the seventh element 235 of the unordered list 205 is compared to the largest element in the result buffer (the last entry in the array of indices 215). In the illustrated embodiment, the seventh element 235 has a value of 32, which is smaller than the largest element in the result buffer (having a value of 57 and occupying position 1). Since the seventh element 235 has a value that is smaller than the largest element in the result buffer 212, the largest element in the result buffer 212 is replaced by the seventh element 235. The auxiliary array of indices 215 is then resorted such that the first entry in the array corresponds to the smallest element in the result buffer 212 and the last entry in the array corresponds to the largest element in the result buffer 212.

Figure 2D:
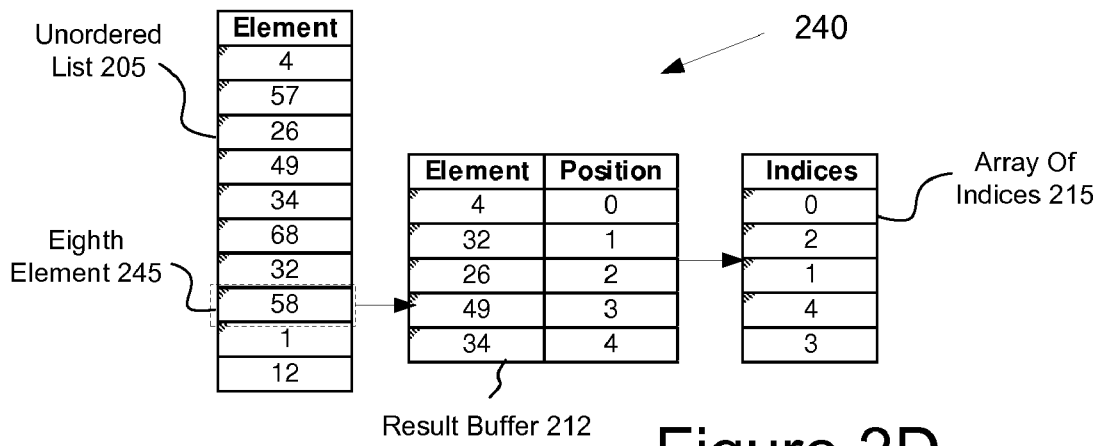
FIG. 2D illustrates a fourth exemplary stage in a process for finding the smallest five elements in an unordered list, in accordance with one embodiment of the present invention.

FIG. 2D illustrates a fourth exemplary stage 240 in a process for finding the smallest five elements in an unordered list, in accordance with one embodiment of the present invention. In the fourth exemplary stage 240, the eighth element 245 of the unordered list 205 is compared to the largest element in the result buffer (the last entry in the array of indices 215). In the illustrated embodiment, the eighth element 245 has a value of 58, which is larger than the largest element in the result buffer (having a value of 49 and occupying position 3). Therefore the eighth element 245 is not copied into the result buffer 212.

Figure 2E:
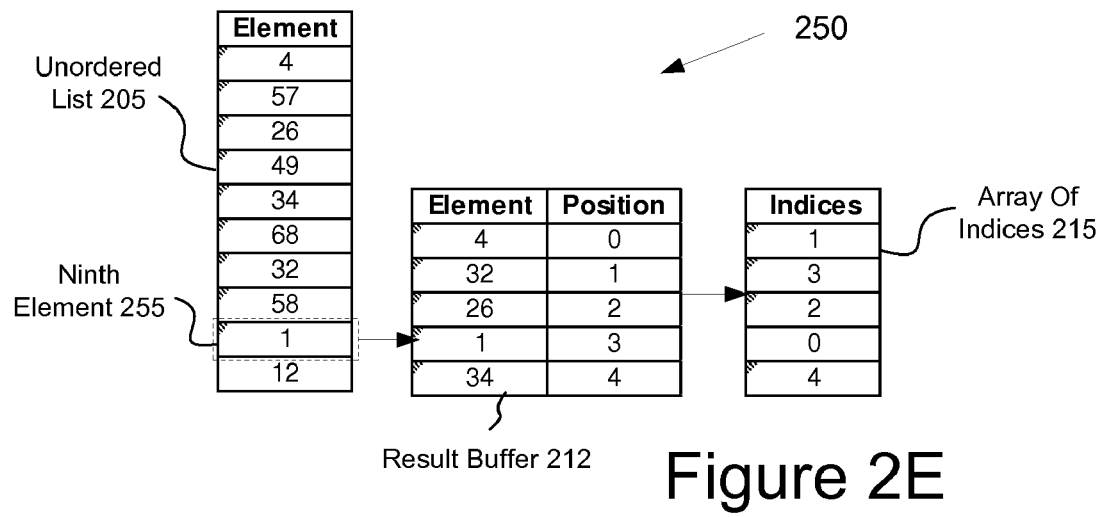
FIG. 2E illustrates a fifth exemplary stage in a process for finding the smallest five elements in an unordered list, in accordance with one embodiment of the present invention.

FIG. 2E illustrates a fifth exemplary stage 250 in a process for finding the smallest five elements in an unordered list, in accordance with one embodiment of the present invention. In the fifth exemplary stage 250, the ninth element 255 of the unordered list 205 is compared to the largest element in the result buffer 212 (the last entry in the array of indices 215). In the illustrated embodiment, the ninth element 255 has a value of 1, which is smaller than the largest element in the result buffer (having a value of 49 and occupying position 3). Therefore, the largest element in the result buffer 212 is replaced by the ninth element 255, and the element at position three then has a value of 1. The array of indices is then resorted such that the first entry in the array corresponds to the smallest element in the result buffer 212 and the last entry in the array corresponds to the largest element in the result buffer 212.

Figure 2F:
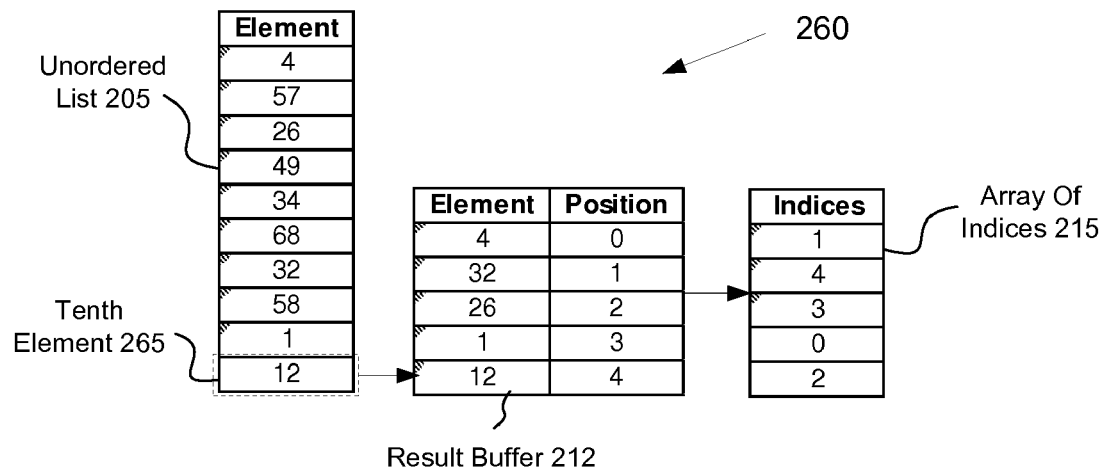
FIG. 2F illustrates a sixth exemplary stage in a process for finding the smallest five elements in an unordered list, in accordance with one embodiment of the present invention.

FIG. 2F illustrates a sixth exemplary stage 260 in a process for finding the smallest five elements in an unordered list, in accordance with one embodiment of the present invention. In the sixth exemplary stage 260, the tenth element 265 of the unordered list 205 is compared to the largest element in the result buffer 212 (the last entry in the array of indices 215). In the illustrated embodiment, the tenth element 265 has a value of 12, which is smaller than the largest element in the result buffer 212 (having a value of 34 and position 4). Therefore, the largest element in the result buffer 212 is replaced by the tenth element 265, and the element at position 4 then has a value of 12. The array of indices 215 is then resorted.

The five smallest elements are determined once all elements in the unordered list 205 have been examined (e.g., compared to the elements in the result buffer 212). Therefore, all elements have been examined at the sixth exemplary stage 260, and the result buffer 212 includes the five smallest values in the unordered list 205. The auxiliary array of indices 215 indicates relative sizes of the elements, and allows for the smallest values to be presented in ascending order.

Embodiments of the present invention enable the smallest elements in the unordered list 205 to be determined by examining each element in the unordered list 205 only a single time. This is in contrast to conventional methods for finding multiple largest or smallest elements in an unordered list, which require at least some elements in an unordered list 205 to be examined numerous times. Thus, embodiments of the present invention may significantly improve the efficiency of finding multiple superlatives in an unordered list. This may especially be the case for finding the k smallest (or largest) values in an unordered list of n values where k is less than or equal to half of n.

Figure 3:
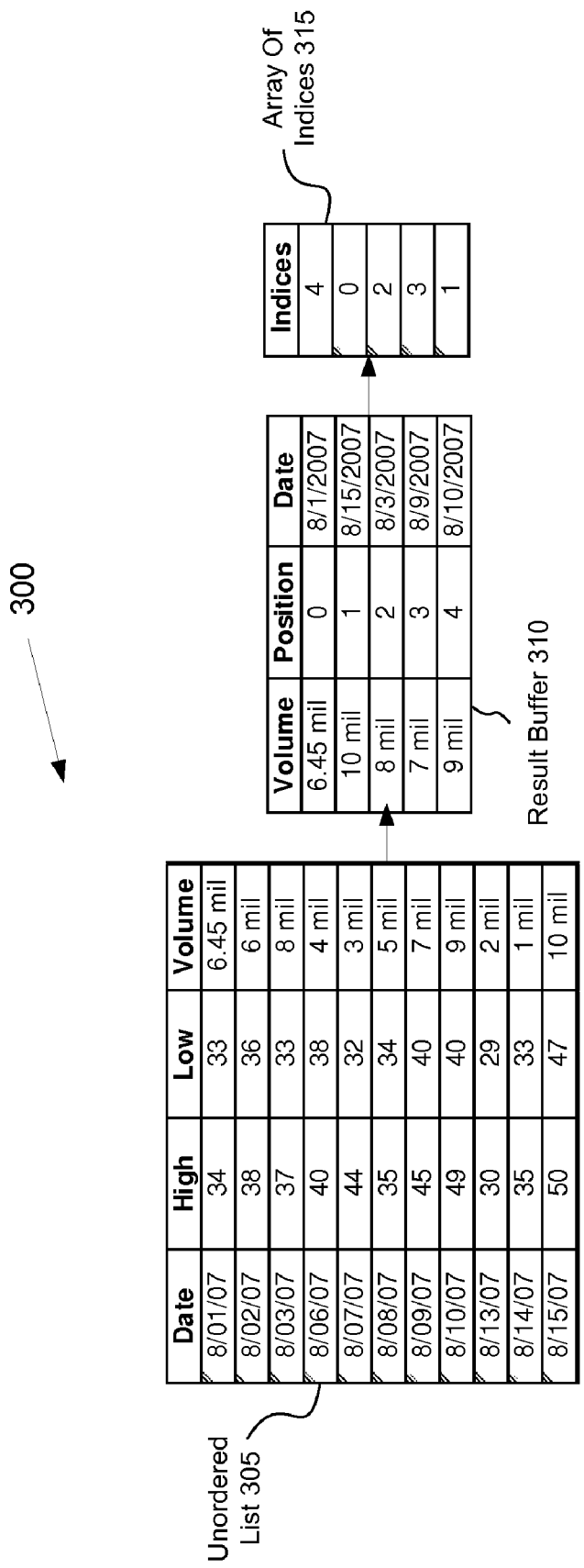
FIG. 3 illustrates a result of a search for the five largest elements in an unordered list, in accordance with one embodiment of the present invention.

FIG. 3 illustrates a result 300 of a search for the five largest elements in an unordered list, in accordance with one embodiment of the present invention. The result is included in a result buffer 310, and has been sorted by an auxiliary array of indices 315. In one embodiment, the auxiliary array of indices 315 is part of the result buffer 310. Alternatively, the auxiliary array of indices 315 may be separate from the result buffer 310. In one embodiment, the result 300 was determined by comparator 120 of FIG. 1.

Referring to FIG. 3, the search for the largest elements is keyed to the volume column of the unordered list 305. In general, a search, sort or other query can be keyed to any available information. By keying a search (or a sort or other query) to a particular article of information (e.g., a particular category of element), a search may be more precisely targeted. The illustrated embodiment provides an example of a search that is keyed to trading volume for a stock. Alternatively, the search could be keyed to dates, stock highs, stock lows, etc.

Each entry in the result buffer 310 may include a pointer to a corresponding entry in the unordered list 305. The pointer may be used to locate that element in the unordered list 305, and thus to examine other information associated with the keyed information. For example, a user could determine what the highest and lowest stock prices were on the days having the highest trading volume. Alternatively, one or more additional items of information may be stored along with the keyed element in the result buffer 310. For example, result buffer 310 includes a date associated with each volume element. The stock high and low values could equally be stored in the result buffer 310.

The auxiliary array of indices 315 sorts the entries in the result buffer 310 from highest to lowest. Alternatively, the auxiliary array of indices 315 could sort the entries in the result buffer 310 from lowest to highest. As shown, the highest volume was on Aug. 15, 2007, and is in position 1. The lowest volume was on Aug. 15, 2007, and is in position 0.

Figure 4:
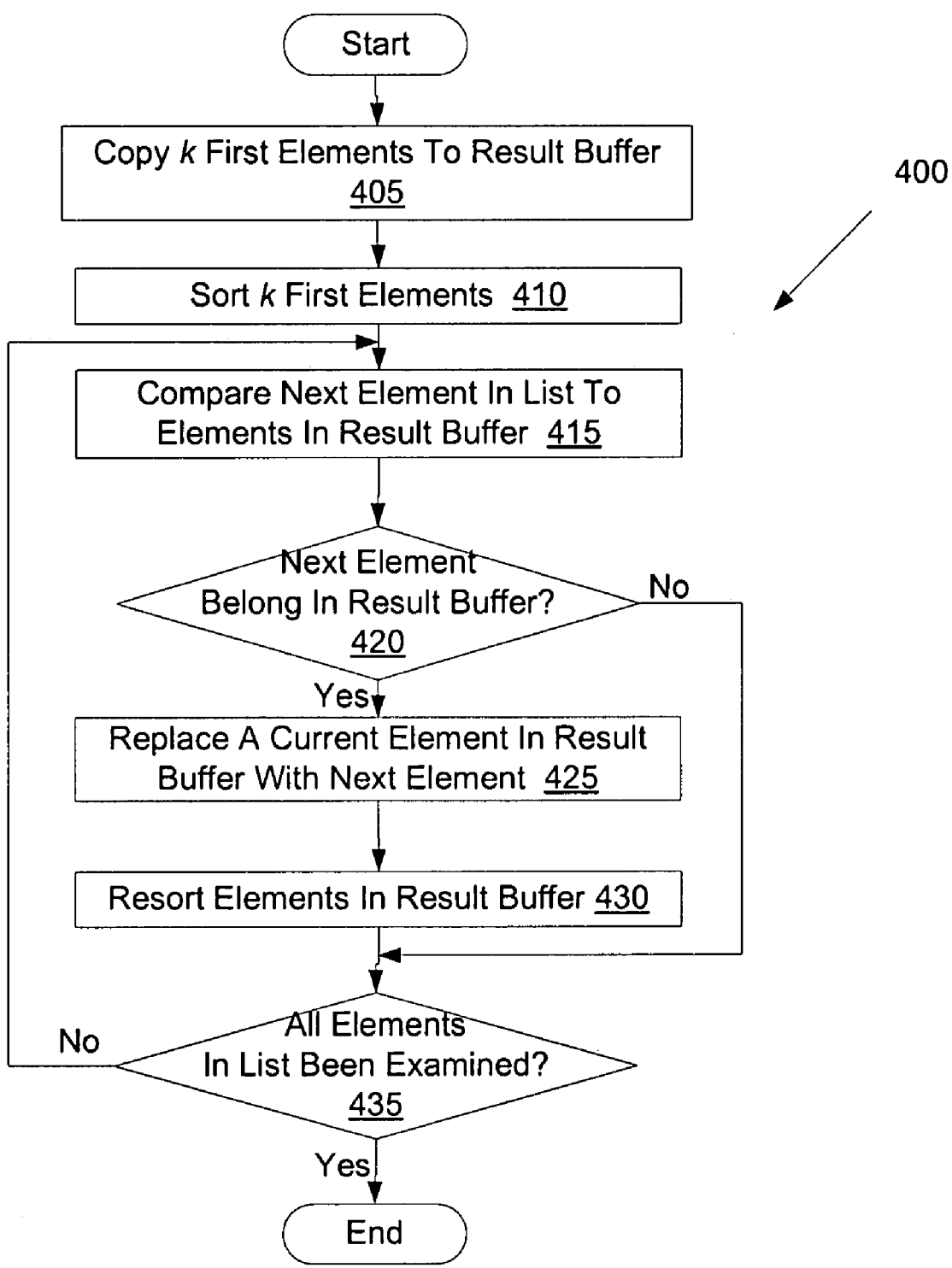
FIG. 4 illustrates a flow diagram of one embodiment for a method of finding the k largest or smallest elements in an unordered list.

FIG. 4 illustrates a flow diagram of one embodiment for a method 400 of finding the k largest or smallest elements in an unordered list. The method may be performed by processing logic that may comprise hardware (e.g., circuitry, dedicated logic, programmable logic, microcode, etc.), software (such as instructions run on a processing device), or a combination thereof. In one embodiment, method 400 is performed by comparator 120 of FIG. 1A.

Referring to FIG. 4, method 400 includes copying the k first elements from an unordered list to a result buffer (block 405). The value of k can be user selected, determined by an application or program, or selected automatically based on predetermined criteria. The result buffer can be allocated when copying the k first values.

At block 410, the k first elements in the result buffer are sorted. The k first elements in the result buffer may be sorted from highest to lowest or from lowest to highest. In one embodiment, the elements in the result buffer are sorted by using an auxiliary array of indices. Alternatively, the elements in the result buffer may be sorted without using an auxiliary array of indices. Elements may be sorted using any sorting techniques or algorithms such as, for example, bubble sorting, cocktail sorting, heap sorting, etc. In some embodiments it is preferable to use sorting algorithms that are efficient on mostly ordered lists. Examples of such sorting algorithms include bubble sorting and heap sorting.

At block 415, a next element in the unordered list is compared to the elements in the result buffer. If the largest elements in the unordered list are being searched for, then the next element in the unordered list may be compared to the smallest element in the result buffer. If the smallest elements in the unordered list are being searched for, then the next element in the unordered list may be compared to the largest element in the result buffer.

At block 420, processing logic determines whether the next element in the unordered list belongs in the result buffer. If smallest elements are being searched for, the next element belongs in the result buffer if it is smaller than the largest element in the result buffer. If largest elements are being searched for, the next element belongs in the result buffer if it is larger than the smallest element in the result buffer. If the next element belongs in the result buffer, the method proceeds to block 425. If the next element does not belong in the result buffer, the method proceeds to block 435.

At block 425, a current element in the result buffer is replaced with the next element. If the largest elements are being searched for, the smallest element in the result buffer is replaced. If the smallest elements are being searched for, the largest element in the result buffer is replaced.

At block 430, the elements in the result buffer are resorted. The resorting may apply the same sorting technique as was originally used to sort the result buffer. Alternatively, the resorting may use a different sorting technique than was originally used. For example, the initial sorting may be performed with a sorting algorithm that is efficient for totally unordered data (e.g., insertion sort, quicksort, etc.), and the resorting may be performed with a sorting algorithm that is efficient for mostly ordered data (e.g., bubble sort, selection sort, cocktail sort, etc.).

At block 435, processing logic determines whether all elements in the unsorted list have been examined. If not all of the elements have been examined, the method continues to block 415, and the next element is compared to the result buffer. If all of the elements in the list have been examined, then the k largest (or smallest) elements in the unordered list have been determined, and the method ends.

Figure 5:
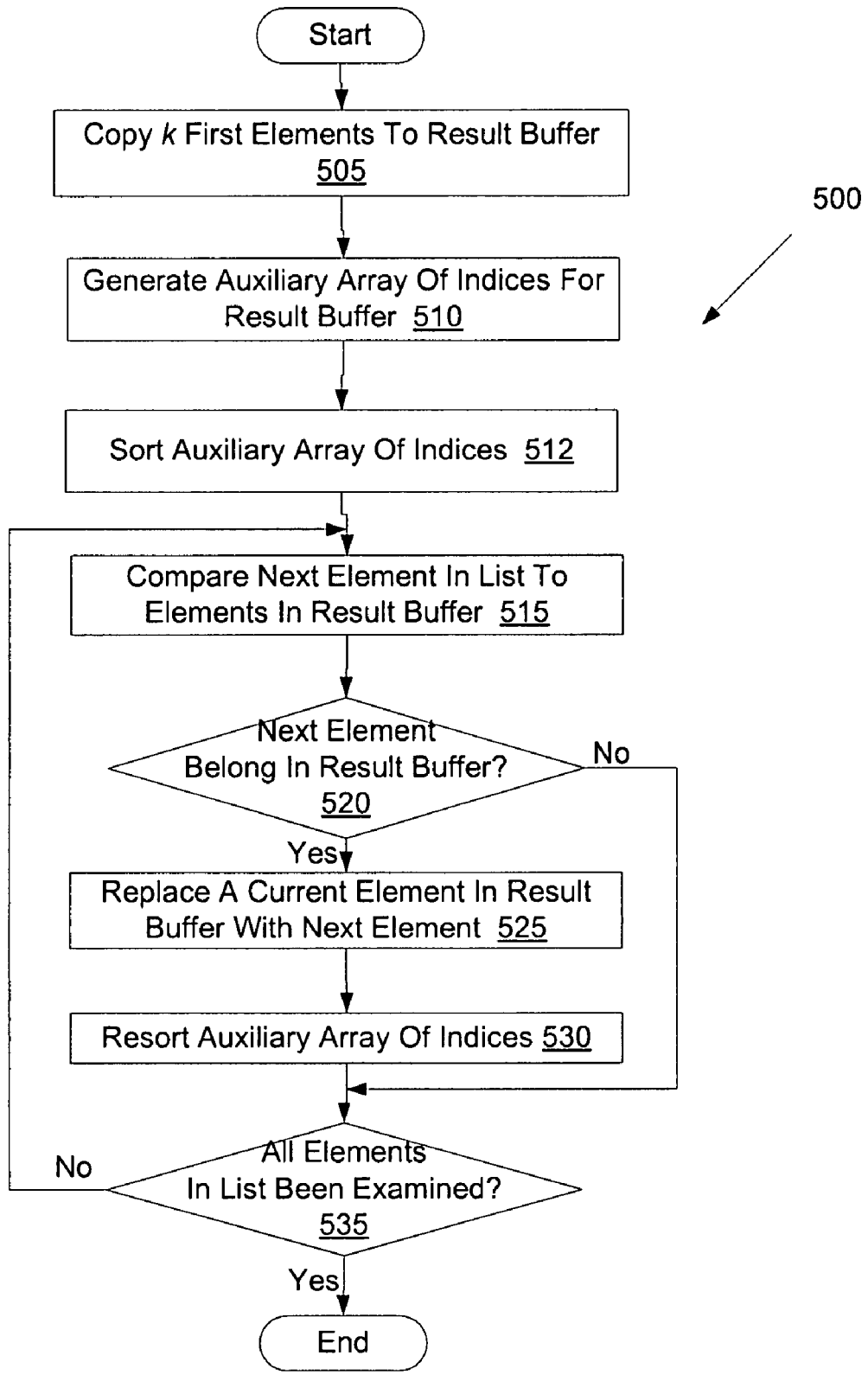
FIG. 5 illustrates a flow diagram of another embodiment for a method of finding the k largest or smallest elements in an unordered list.

FIG. 5 illustrates a flow diagram of another embodiment for a method 500 of finding the k largest or smallest elements in an unordered list. The method may be performed by processing logic that may comprise hardware (e.g., circuitry, dedicated logic, programmable logic, microcode, etc.), software (such as instructions run on a processing device), or a combination thereof. In one embodiment, method 500 is performed by comparator 120 of FIG. 1A.

Referring to FIG. 5, method 500 includes copying the k first elements from an unordered list to a result buffer (block 505). At block 510, an auxiliary array of indices is generated for the elements in the result buffer. Each entry in the auxiliary array of indices may correspond to an element in the result buffer. At block 512, the auxiliary array of indices is sorted. The auxiliary array of indices may be sorted from highest to lowest or from lowest to highest, and may be sorted using any sorting technique, such as bubble sorting, cocktail sorting, heap sorting, etc.

At block 515, a next element in the unordered list is compared to the elements in the result buffer. If the largest elements in the unordered list are being searched for, then the next element in the unordered list may be compared to the smallest element in the result buffer. If the smallest elements in the unordered list are being searched for, then the next element in the unordered list may be compared to the largest element in the result buffer.

At block 520, processing logic determines whether the next element in the unordered list belongs in the result buffer. If smallest elements are being searched for, the next element belongs in the result buffer if it is smaller than the largest element in the result buffer. If largest elements are being searched for, the next element belongs in the result buffer if it is larger than the smallest element in the result buffer. If the next element belongs in the result buffer, the method proceeds to block 525. Otherwise, the method proceeds to block 535.

At block 525, a current element in the result buffer is replaced with the next element. If the largest elements are being searched for, the smallest element in the result buffer is replaced. If the smallest elements are being searched for, the largest element in the result buffer is replaced.

At block 530, the auxiliary array of indices is resorted. The resort may apply the same sorting technique as was originally used to sort the result buffer. Alternatively, the resort may use a different sorting technique than was originally used.

At block 535, processing logic determines whether all elements in the unsorted list have been examined. If not all of the elements have been examined, the method continues to block 415, and the next element is compared to the result buffer. If all of the elements in the list have been examined, then the k largest (or smallest) elements in the unordered list have been determined, and the method ends.

Figure 6:
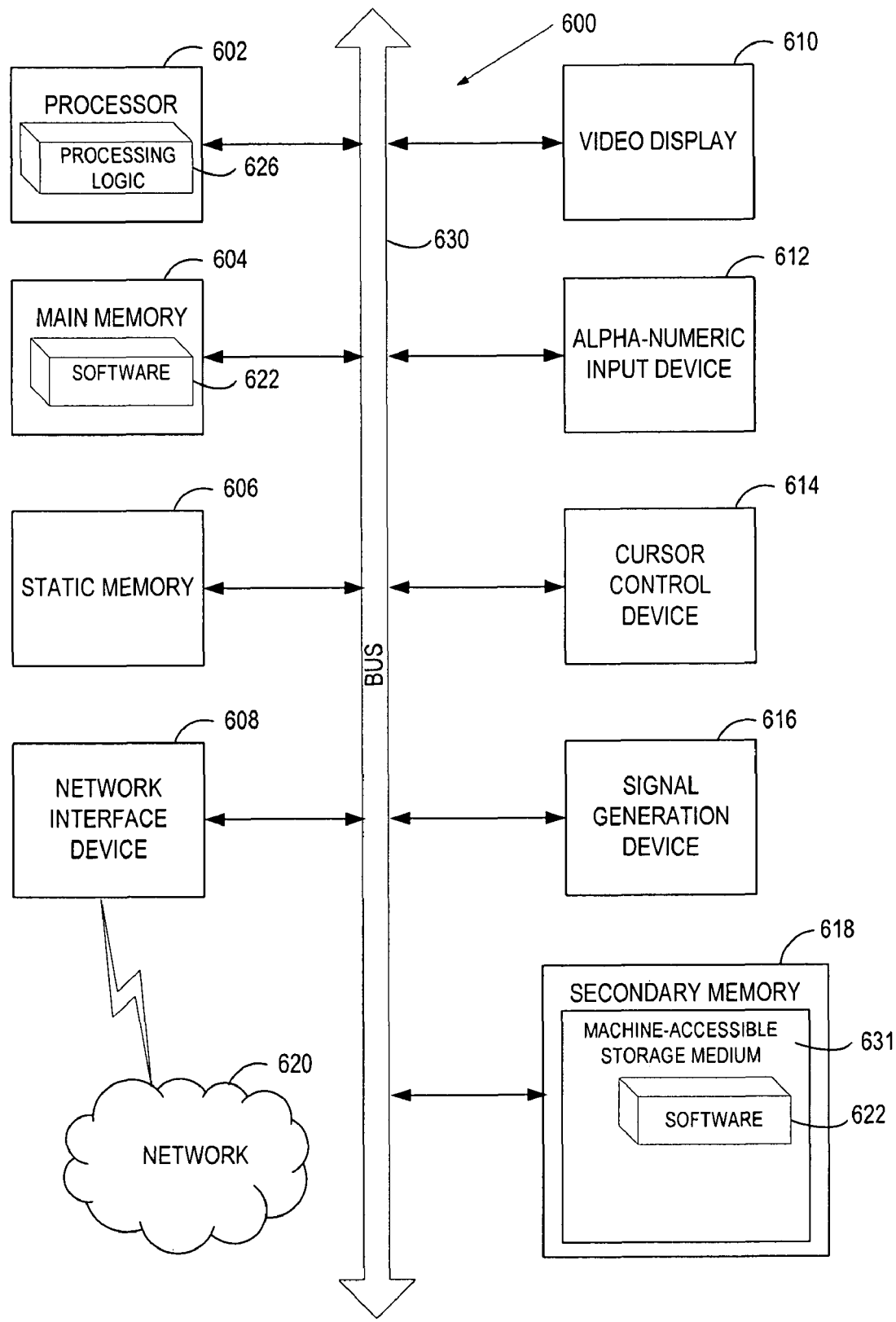
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-accessible storage media. The software 622 may further be transmitted or received over a network 620 via the network interface device 608.

The machine-accessible storage medium 631 may also be used to store data structure sets that define user identifying states and user preferences that define user profiles. Data structure sets and user profiles may also be stored in other sections of computer system 600, such as static memory 606.

While the machine-accessible storage medium 631 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   copying, by a computer system executing a comparator, k first elements from an unordered list of n total elements to a result buffer, wherein k is a value smaller than n;
   generating an auxiliary array of indices for the result buffer, each entry in the auxiliary array of indices corresponding to a position in the result buffer;
   sorting the auxiliary array of indices without rearranging an order of the elements in the result buffer; and
   for each element subsequent to the k first elements in the unordered list,
      comparing a value of the subsequent element to a value of a superlative copied element in the result buffer,
      determining whether the subsequent element belongs in the result buffer based on the comparison, and
      if the subsequent element belongs in the result buffer, replacing the superlative copied element in the result buffer with the subsequent element and resorting the auxiliary array of indices.

2. The method of claim 1, wherein the superlative copied element in the result buffer corresponds to a last entry in the auxiliary array of indices.

3. The method of claim 1, wherein the auxiliary array of indices is a component of the result buffer.

4. The method of claim 1, wherein:
the entries in the auxiliary array of indices are sorted from largest to smallest, and
the subsequent element belongs in the result buffer if the value of the subsequent element is larger than a value of a smallest element in the result buffer, wherein the smallest element in the result buffer is the superlative copied element.

5. The method of claim 1, wherein:
the entries in the auxiliary array of indices are sorted from smallest to largest, and
the subsequent element belongs in the result buffer if the value of the subsequent element is smaller than a value of a largest element in the result buffer, wherein the largest element in the result buffer is the superlative copied element.

6. The method of claim 1, further comprising:
for each element in the result buffer, storing a pointer to a corresponding list element in the unordered list.

7. The method of claim 1, further comprising:
generating a copy of the unordered list.

8. A non-transitory computer readable medium including instructions that, when executed by a machine, cause the machine to perform a method comprising:
copying, by a computer system executing a comparator, k first elements from an unordered list of n total elements to a result buffer, wherein k is a value smaller than n;
generating an auxiliary array of indices for the result buffer, each entry in the auxiliary array of indices corresponding to a position in the result buffer;
sorting the auxiliary array of indices without rearranging an order of the elements in the result buffer; and
for each element subsequent to the k first elements in the unordered list,
comparing a value of the subsequent element to a value of a superlative copied element in the result buffer,
determining whether the subsequent element belongs in the result buffer based on the comparison, and
if the subsequent element belongs in the result buffer, replacing the superlative copied element in the result buffer with the subsequent element and resorting the auxiliary array of indices.

9. The non-transitory computer readable medium of claim 8, wherein the superlative copied element in the result buffer corresponds to a last entry in the auxiliary array of indices.

10. The non-transitory computer readable medium of claim 8, wherein the auxiliary array of indices is a component of the result buffer.

11. The non-transitory computer readable medium of claim 8, wherein:
the entries in the auxiliary array of indices are sorted from largest to smallest, and
the subsequent element belongs in the result buffer if the value of the subsequent element is larger than a value of a smallest element in the result buffer, wherein the smallest element in the result buffer is the superlative copied element.

12. The non-transitory computer readable medium of claim 8, wherein:
the entries in the auxiliary array of indices are sorted from smallest to largest, and
the subsequent element belongs in the result buffer if the value of the subsequent element is smaller than a value of a largest element in the result buffer, wherein the largest element in the result buffer is the superlative copied element.

13. The non-transitory computer readable medium of claim 8, the method further comprising:
for each element in the result buffer, storing a pointer to a corresponding list element in the unordered list.

14. The non-transitory computer readable medium of claim 8, the method further comprising:
generating a copy of the unordered list.

15. A computing apparatus, comprising:
a memory to store a result buffer and an auxiliary array of indices for the result buffer, wherein the result buffer to store a copy of k first elements from an unordered list of n total elements, wherein k is a value smaller than n, and wherein each entry in the auxiliary array of indices corresponds to a position in the result buffer; and
a processing device to execute instructions for a comparator, the instructions to cause the processing device to sort the auxiliary array of indices without rearranging an order of the elements in the result buffer, to compare each element subsequent to the k first elements in the unordered list to a superlative copied element in the result buffer, wherein comparing the subsequent element to the superlative copied element includes comparing a value of the subsequent element to a value of the superlative copied element, to determine whether the subsequent element belongs in the result buffer based on the comparison, and if the subsequent element belongs in the result buffer, to replace the superlative copied element in the result buffer with the subsequent element and resort the auxiliary array of indices.

16. The computing apparatus of claim 15, wherein the auxiliary array of indices is a component of the result buffer.

17. The computing apparatus of claim 15, wherein:
the entries in the auxiliary array of indices are sorted from largest to smallest, and
the subsequent element belongs in the result buffer if the value of the subsequent element is larger than a value of a smallest element in the result buffer, wherein the smallest element in the result buffer is the superlative copied element.

18. The computing apparatus of claim 13, wherein:
the entries in the auxiliary array of indices are sorted from smallest to largest, and
the subsequent element belongs in the result buffer if the value of the subsequent element is smaller than a value of a largest element in the result buffer, wherein the largest element in the result buffer is the superlative copied element.

19. The computing apparatus of claim 15, wherein the instructions cause the processing device to store a pointer to a list element in the unordered list for each corresponding element in the result buffer.

20. The computing apparatus of claim 15, wherein the instructions cause the processing device to generate a copy of the unordered list.

* * * * *